M. DE CESARE AND J. DELLE CHIAIE.
AUTOMOBILE JACK.
APPLICATION FILED JAN. 8, 1917.
1,309,511.
Patented July 8, 1919.
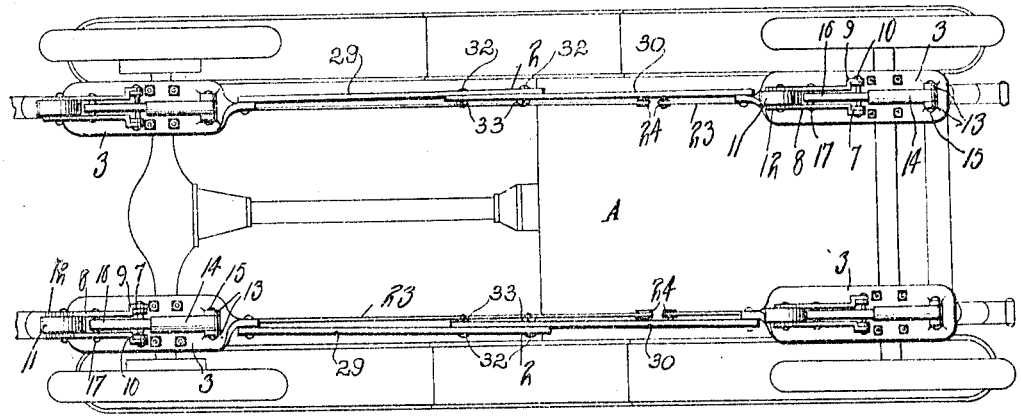
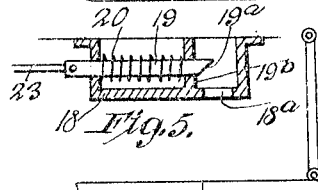
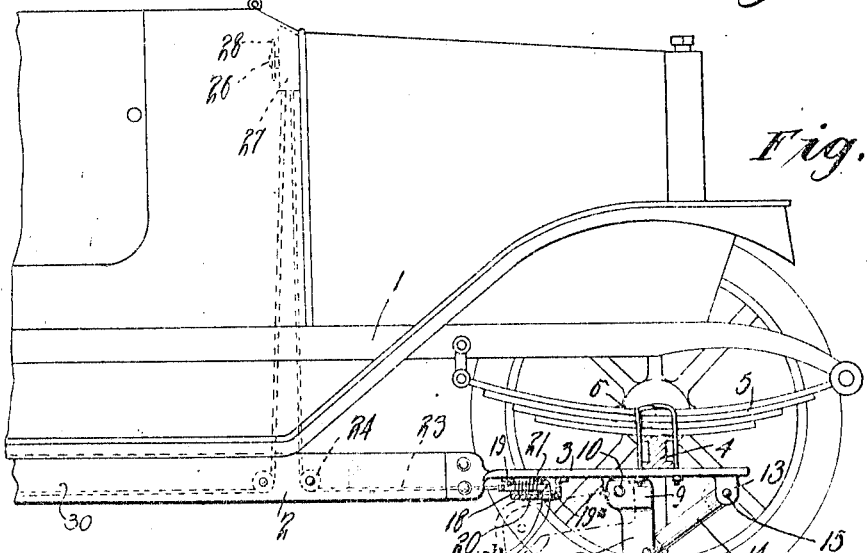
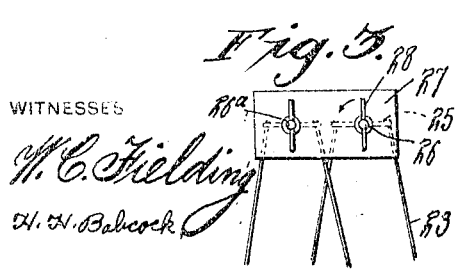
WITNESSES
W. C. Fielding
H. N. Babcock
INVENTORS
Matteo De Cesare
and Joseph Delle Chiaie
BY Richard Owen
ATTORNEY

UNITED STATES PATENT OFFICE.

MATTEO DE CESARE AND JOSEPH DELLE CHIAIE, OF CLIFTON, NEW JERSEY, ASSIGNORS OF ONE-THIRD TO PANFILO DIODATO, OF NEW YORK, N. Y.

AUTOMOBILE-JACK.

1,309,511.     Specification of Letters Patent.     Patented July 8, 1919.

Application filed January 3, 1917. Serial No. 141,292.

*To all whom it may concern:*

Be it known that we, MATTEO DE CESARE and JOSEPH DELLE CHIAIE, subjects of the King of Italy, residing at Clifton, in the county of Passaic and State of New Jersey, have invented certain new and useful Improvements in Automobile-Jacks, of which the following is a specification.

This invention relates to automobile jacks, and more particularly to a jack adapted to be mounted on an automobile so as to at all times be in position for use.

One of the main objects of the invention is to provide an automobile having a plurality of jacks secured thereto so mounted that, by reversing the drive of the automobile, one or all of the wheels of the vehicle may be jacked up or raised from the ground surface. A further object is to provide a jack of simple construction and operation capable of being mounted on an automobile frame and means for normally holding the jack in inoperative position. A still further object is to provide simple and efficient means for holding the jack in inoperative position which may be easily operated so as to release the jack. Further objects will appear from the detailed description.

In the drawings:

Figure 1 is an underneath view of an automobile with a jacking apparatus constructed in accordance with our invention applied.

Fig. 2 is a side view of the front portion of an automobile with our jack applied, Fig. 3 is a detail of the hand levers for releasing the jack and the casing for the same, Fig. 4 is a detail of the means for adjusting the connecting bar longitudinally.

Fig. 5 is a detail view in section on an enlarged scale of the bolt and casing.

Below and parallel with each side bar 1 of the frame of the automobile A is mounted a longitudinally extending bar 2. The front end of this bar is riveted to a supporting plate 3 which is secured to the front axle 4 and spring 5 of the automobile by means of crossed U-clips 6 passed about the axle and spring with the ends of their arms inserted through the plate 3 and secured through the same by nuts, in the usual manner. At its approximate center the plate 3 is provided with two spaced downwardly extending lugs 7. A jack arm 8 is provided at its upper end with off-set ears 9 which are pivotally secured to the lugs 7 by the pivot bolt 10. A bearing wheel 11 is rotatably mounted in the free end of this arm. The side walls of arm 8, at the lower end thereof, are cut to form a triangular point 12 which extends somewhat beyond the periphery of wheel 11 and below the axis of rotation of the wheel.

A pair of spaced lugs 13 are provided at the forward end of plate 3 and extend downwardly therefrom. A sleeve 14 has its forward end pivotally secured between these lugs, as at 15. This sleeve is bored out to slidably receive a brace rod 16 the end of which is pivotally secured between the side walls of the jack arm 8, as at 17. When the jack arm 8 is dropped, the points 12 of arm 8 will first engage the surface upon which the automobile is traveling. If the direction of travel of the automobile be reversed, so that is is driven backward, the points 12 will bite into the ground surface so as to prevent rearward movement of the jack arm. As the automobile moves rearward the jack arm 8 will be swung downward and forward about the pivot pin 10 so as to raise the automobile wheel adjacent which the jack is mounted. When the axis of rotation of the wheel 11 is passed forward beyond the axis of pivot pin 10, wheel 11 will be brought into engagement with the ground surface. With the jack in this position the weight of the automobile will tend to force the jack forward, this forward movement of the jack being positively limited by rod 16 and sleeve 14, the bore in sleeve 14 being of such length as to permit movement of the jack arm 8 into an approximately vertical position, as in Fig. 3 of the drawings. In this position the sleeve 14 and brace rod 16 constitute an inclined brace which hold the jack in operative position, all tendency of the jack to move rearward being eliminated due to the fact that the pivot pin 10 is behind the axis of roller or wheel 11. When it is desired to lower the machine, it is only necessary to drive the automobile forward. This will force the wheel 11 rearward of the machine, due to the load upon it and its frictional engagement with the surface of the ground, sufficiently to bring the points 12 of the jack arm 8 into engagement with the ground surface. The points bite into the ground surface so that the arm is secured against movement, the points 12 acting as a fulcrum for the forward rocking of the arm, the arm also rocking or rotating slightly about pivot pin 10. This moves the jack arm into inoperative position so as to lower the automobile wheel, as will be evident. In this position the jack is free to be raised upward and rearward into approximate parallelism with, and closely adjacent, the underface of plate 3, in which position it is normally secured by a suitable securing means.

Adjacent the inner end of plate 3 is mounted a casing or housing 18. A bolt 19 is slidably mounted through this housing and is normally held in forward or extended position by a coil expansion spring 20 mounted about the bolt within the housing and confined between the inner end of the housing and a pin 21 passed through the bolt. The forward end of bolt 19 is beveled upwardly, as at 19$^a$, and projects into the casing 18. This bolt is adapted to engage into an eye 22 secured to the jack arm 8 at the back, and near the lower end, of the same. When the jack is raised into inoperative position, bolt 19 engages into eye 22 thus securing the jack in the position indicated by broken lines in Fig. 2 of the drawings. To release the jack a cable 23 is secured to the inner end of bolt 19. This cable is passed about a guide pulley 24 mounted on the inner face of bar 2, and is secured to one end of an arm or lever 25 secured on a stub-shaft 26 rockably mounted in a casing 27 secured to the dash of the automobile A. Stub-shaft 26 is provided with two laterally extending wings 28, this shaft constituting in effect a hand lever for rocking the lever 25. When shaft 26 is rocked in the direction indicated by the arrow in Fig. 3 of the drawings, cable 23 will be tensioned so as to draw the bolt 19 into inoperative position thus releasing the jack in the manner previously described.

Bolt 19 is slidable through the inner end wall of casing 18, and the partition 19$^b$ intermediate the ends of the casing. The casing 18 is provided with an opening 18$^a$ in vertical alinement with the bolt 19 to accommodate the eye 22 of the jack. By this construction the casing 18 entirely incloses the lock bolt so as to protect the same, all danger of the user or his clothing being torn or injured by the bolt being thus eliminated.

In practice we provide a plate 3 and a jack carried thereby adjacent each wheel of the automobile, and provide means similar to that described for holding each jack in inoperative position, and a rockable shaft arm for releasing any jack desired. As will be clear from Figs. 1 and 3 of the drawings, by rocking either one of the shafts 26 or 26$^a$ in either direction desired, any one of the four jacks may be released so as to be moved into operative position or, if desired, all four of the jacks may be released so as to jack or raise the whole machine.

As will be noted more clearly from Figs. 1 and 4 of the drawings, the bar 2 is formed of two sections or members 29 and 30. These two sections overlap at their inner ends and are each provided with a central longitudinally extending slot 31 adjacent its inner end. Two set screws 32 are passed through the slots 31, and a binding nut 33 is threaded on the inner end of each screw. By this means the two sections of the bar may be quickly and easily secured in adjustment so as to vary the effective length of the bar to accomodate automobile frames of different lengths.

There may be slight changes made in the construction and arrangement of the different parts of our invention without departing from the field and scope of the same, and we intend to include all such changes, as fall within the scope of the appended claims, in this application in which a preferred form only of our invention is disclosed.

What we claim is:

1. The combination of a plate adapted to be secured to an automobile frame, a jack arm pivotally secured at one end to the plate, a telescopic brace pivotally secured at one end to the jack arm intermediate the ends thereof and pivotally secured at the other end to the plate adjacent one end thereof, said arm being provided with an eye, a spring pressed bolt carried by said plate adjacent the other end thereof and adapted to engage into said eye when the jack arm is in raised position, and means for moving the said bolt into retracted position so as to permit the jack arm to move downward and forward about its pivotal axis.

2. In an automobile jack, plates disposed beneath the side beams and axles of an automobile, means connecting said plates for longitudinal adjustment to connect with the axles of automobiles of different lengths or wheel bases, said plates having vertical intermediate portions and horizontal end portions, jacks pivoted to said end portions and beneath the same, said jacks having ground engaging portions and anti-friction wheels, braces for said jacks between the latter and the plates near the extremities thereof, said braces permitting movement of the jacks beneath the plates to horizontal and vertical positions and means for holding said jacks in horizontal positions when raised and for releasing the same simultaneously or independently as desired.

In testimony whereof we affix our signatures in presence of two witnesses.

MATTEO De CESARE.
JOSEPH DELLE CHIAIE.

Witnesses:
JOHN E. BURCH,
PANFILO DIODATO.